US010723159B2

(12) United States Patent
Horiuchi

(10) Patent No.: US 10,723,159 B2
(45) Date of Patent: Jul. 28, 2020

(54) MULTILAYERED PRINTED MATTER

(71) Applicant: MIMAKI ENGINEERING CO., LTD., Nagano (JP)

(72) Inventor: Yuhei Horiuchi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/260,006

(22) Filed: Jan. 28, 2019

(65) Prior Publication Data

US 2019/0248166 A1 Aug. 15, 2019

(30) Foreign Application Priority Data

Feb. 15, 2018 (JP) ................................ 2018-025447

(51) Int. Cl.
*B41M 5/00* (2006.01)
*B41M 5/50* (2006.01)
(Continued)

(52) U.S. Cl.
CPC .......... *B41M 5/0023* (2013.01); *B41M 5/504* (2013.01); *B42D 25/351* (2014.10);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 4,307,899 A * 12/1981 Hoppe ..................... B41M 3/14 283/110
5,042,842 A * 8/1991 Green ................... G09F 3/0292 428/202

(Continued)

FOREIGN PATENT DOCUMENTS

| | | |
|---|---|---|
| EP | 0632405 | 1/1995 |
| JP | 2009128734 | 6/2009 |
| WO | 02070269 | 9/2002 |

OTHER PUBLICATIONS

"Search Report of Europe Counterpart Application", dated Apr. 17, 2019, p. 1-p. 8.

(Continued)

*Primary Examiner* — Manish S Shah
(74) *Attorney, Agent, or Firm* — JCIPRNET

(57) ABSTRACT

A multilayered printed matter includes print layers (pattern layers) formed on a medium and having patterns printed thereon, and a concealing layer interposed between the print layers. The concealing layer conceals the pattern printed on one of the pattern layers not to affect the pattern of the other pattern layer. The concealing layer is formed on a back side relative to the other pattern layer. The print layers between the medium and one of the print layers on the back side of the other pattern layer (back-side print layers) respectively have recessed parts recessed into their surfaces toward the back side. The back-side print layer between the other pattern layer and the medium has a protruding part to fill one of the recessed parts and thereby planarize a surface of the back-side print layer. Hence achieving improved appearance and visual quality of the multilayered printed matter.

9 Claims, 6 Drawing Sheets

(51) Int. Cl.

| | |
|---|---|
| ***B41M 3/00*** | (2006.01) |
| ***B41M 3/14*** | (2006.01) |
| ***G09F 13/04*** | (2006.01) |
| ***B42D 25/378*** | (2014.01) |
| ***B42D 25/351*** | (2014.01) |

(52) U.S. Cl.
CPC ........... *B42D 25/378* (2014.10); *G09F 13/04* (2013.01); *B41M 3/008* (2013.01); *B41M 3/14* (2013.01); *B41M 2205/36* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | | |
|---|---|---|---|---|
| 2003/0017315 | A1* | 1/2003 | Hill .......................... | B41M 1/18 428/202 |
| 2012/0074684 | A1* | 3/2012 | Marchant ............... | B42D 25/29 283/85 |
| 2019/0066551 | A1* | 2/2019 | Horiuchi ............... | G06F 3/1256 |

OTHER PUBLICATIONS

"Office Action of Europe Counterpart Application" , dated Jun. 4, 2016, p. 1-p. 6.

* cited by examiner

MULTILAYERED PRINTED MATTER

CROSS REFERENCE TO RELATED APPLICATIONS

This application claims the priority benefit of Japanese Patent Application No. 2018-025447, filed on Feb. 15, 2018. The entirety of the above-mentioned patent application is hereby incorporated by reference herein and made a part of this specification.

TECHNICAL FIELD

This disclosure relates to a multilayered printed matter including a plurality of print layers formed on a medium.

DESCRIPTION OF THE BACKGROUND ART

There are known transparent or semitransparent sheets having patterns printed on both of their front and back surfaces (see, for example, JP 2009-128734 A). When the sheet described in JP 2009-128734 A is receiving light from a front-surface side, with no light from a light source disposed on a back-surface side, it is mostly the pattern printed on the front surface of this sheet that is visually recognized from the front-surface side. On the other hand, when this sheet is being exposed to light radiated from the light source on the back-surface side, with light coming from the front-surface side being substantially blocked, the pattern printed on the back surface may be visible from the front-surface side under light radiated from the light source. Then, the pattern may be more easily caught by the eye from the front side than when observed without light from the light source on the back-surface side.

In the sheet described in JP 2009-128734 A irradiated with light from the front-surface side, the pattern printed on the back surface may possibly be caught by the eye from the front-surface side, even without any light from the light source on the back-surface side. To address this identified issue of the known art, a multilayered printed matter including a plurality of print layers formed on a medium; two pattern layers having patterns printed thereon, and concealing layers formed between the two pattern layers so as to conceal the pattern on one of the pattern layers not to affect the pattern on the other pattern layer.

The multilayered printed matter includes, for example, a medium 102 such as an acrylic board, and four print layers 103 to 106 formed on the medium 102, as illustrated in FIG. 8. The print layers 106, 105, 104, and 103 are stacked on one another upward in the mentioned order on a surface of the medium 102. The print layers 103 to 106 are formed one by one by ejecting and curing UV-curable inks. The print layers 103 and 106 are pattern layers, and the print layers 104 and 105 are concealing layers. Thus, this printed matter has a two-layered concealing structure.

In this multilayered printed matter, the print layer 106 printed on one surface of the medium 102, which is a pattern layer, may have a part(s) lacking effective pixels and/or a thinner part(s) printed at a lower concentration. Then, a recessed part **106*a* recessed into a surface of the print layer 106 toward the medium 102 may be formed in part of the print layer 106 lacking effective pixels or printed at a lower concentration. The recessed part 106*a* may be filled with ink in part of the print layer 105. As a result of the recessed part 106*a* being filled with ink in part of the print layer 105, a recessed part 105*a* recessed into a surface of the print layer 105 toward the medium 102 may be formed in the print layer 105. The recessed part 105*a* may be filled with ink in part of the print layer 104. As a result of the recessed part 105*a* being filled with ink in part of the print layer 104, a recessed part 104*a* recessed into a surface of the print layer 104 toward the medium 102 may be formed in the print layer 104. The recessed part 104*a* may be filled with ink in part of the print layer 103**.

As a result of the recessed part **104*a* being filled with ink in part of the print layer 103, a recessed part 103*a* recessed into a surface of the print layer 103 toward the medium 102 may be formed at a position(s) irrelevant to a pattern printed on the print layer 103. In case the recessed part 103*a* is formed at a position(s) irrelevant to a pattern printed on the print layer 103 on the surface of the print layer 103** constituting an outermost surface of the multilayered printed matter, the printed matter may look less attractive and degrade in visual quality. Thus, an issue identified with such a multilayered printed matter that includes, as the print layers, two pattern layers and concealing layers formed between the pattern layers, is that multilayered printed matters thus structured may be likely to degrade in appearance and visual quality.

In some multilayered printed matters, the print layer 105, which is part of the concealing layers, may lack effective pixels and accordingly have a recessed part(s). In that case, a recessed part(s) recessed into the surface of the print layer 103 toward the medium 102 may be formed at a position(s) on the print layer 103 irrelevant to the pattern printed thereon. Then, the obtained multilayered printed matter may likewise degrade in appearance and visual quality.

SUMMARY

A multilayered printed matter disclosed herein is a multilayered printed matter including a plurality of print layers formed on a medium. The print layers include a first pattern layer and a second pattern layer respectively having patterns printed thereon, and a concealing layer formed between the first pattern layer and the second pattern layer on a side of the multilayered printed matter closer to the medium than the first pattern layer. The concealing layer conceals the pattern printed on the second pattern layer not to affect the pattern printed on the first pattern layer. Provided that a front side is a side on which the first pattern layer is formed relative to the concealing layer, a back side is a side opposite to the front side, and a first print layer is the print layer on a back side of and in contact with the first pattern layer, the print layer between the medium and the first print layer includes at least one print layer having a recessed part recessed into a surface of the at least one print layer toward the back side, and the print layer between the first pattern layer and the print layer having the recessed part includes at least one print layer having a protruding part protruding toward the back side, the protruding part being formed to fill at least one recessed part so as to planarize a surface of the first print layer. Provided that the print layer having the protruding part is a protrusion-formed layer, the protruding part fills at least the recessed part of the print layer on the back side of and in contact with the protrusion-formed layer.

In the multilayered printed matter disclosed herein, when the print layer on the back side of and in contact with the first pattern layer is referred to as the first print layer, the print layer between the medium and the first print layer includes at least one print layer having a recessed part recessed into the surface of this print layer toward the back side, while the print layer between the first pattern layer and the print layer having the recessed part includes a print layer having a protruding part protruding toward the back side so as to fill at least one recessed part and planarize the surface of the first print layer. When the print layer having the protruding part is referred to as a protrusion-formed layer, the protruding part fills at least the recessed part of the print layer on the back side of and in contact with the protrusion-formed layer.

While one or more print layers between the medium and the first print layer may include any print layer having a recessed part recessed into its surface toward the back side, the first pattern layer may be formed on the substantially planarized surface of the first print layer. In this multilayered printed matter, therefore, any recessed part recessed into the surface of the first pattern layer toward the back side may be difficult to form at a position(s) on the first pattern layer irrelevant to the pattern printed thereon. Thus, the multilayered printed matter formed of the print layers including two pattern layers and a concealing layer(s) therebetween may successfully improve in appearance and visual quality, unlike the known art.

The multilayered printed matter may be further characterized in that the concealing layer includes a plurality of print layers, and at least one of the print layers constituting the concealing layer is the protrusion-formed layer. Thus, an additional labor of forming the protrusion-formed layer apart from the concealing layer may become unnecessary, and the multilayered printed matter may be structurally simplified.

The multilayered printed matter may be further characterized in that the concealing layer includes, as the print layers, a white ink layer made of white ink and a black ink layer made of black ink, and the white ink layer is the protrusion-formed layer. In the multilayered printed matter thus further characterized, when the pattern printed on the second pattern layer is viewed from the front-surface side of this printed matter exposed to light from the back side, the protruding part may be unlikely to affect the pattern of the second pattern layer.

The multilayered printed matter may be further characterized in that the white ink layer on the front side relative to the black ink layer is the protrusion-formed layer. In this instance, the white ink layer, which is the protrusion-formed layer, serves as the first print layer. In the multilayered printed matter thus further characterized, when, for example, the second pattern layer and the black ink layer both lack effective pixels and respectively have recessed parts, the protruding part formed in the white ink layer may be used to fill the recessed parts of the second pattern layer and the black ink layer and thereby planarize the surface of the first print layer.

The multilayered printed matter may include the protrusion-formed layer apart from the concealing layer. In this instance, the protrusion-formed layer may be a white ink layer made of white ink or a clear ink layer made of transparent ink. In the multilayered printed matter thus further characterized, when the pattern printed on the second pattern layer is viewed from the front-surface side of this printed matter exposed to light from the back side, the protruding part may be unlikely to affect the pattern of the second pattern layer.

In this disclosure, the first pattern layer, the concealing layer, and the second pattern layer may be formed on a front-surface side of the medium, and the recessed part may be formed in at least the second pattern layer. The multilayered printed matter may be further characterized in that the concealing layer includes, as the print layers, a white ink layer made of white ink and a black ink layer made of black ink, the second pattern layer is formed on a back-surface side of the medium, the first pattern layer and the concealing layer are formed on a front-surface side of the medium, the white ink layer is formed on the front side of the black ink layer, and the black ink layer has the recessed part.

DETAILED DESCRIPTION OF EMBODIMENTS

Embodiments of this disclosure are hereinafter described referring to the accompanying drawings.

Structural Features of Multilayered Printed Matter

Figure 1:
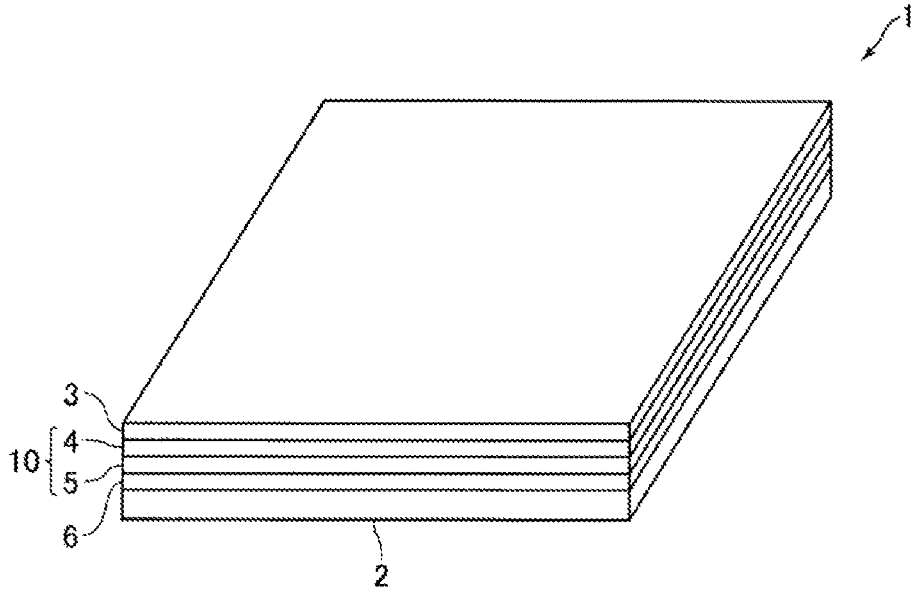
FIG. 1 is a perspective view of a multilayered printed matter according to an embodiment of this disclosure.
Figure 2:
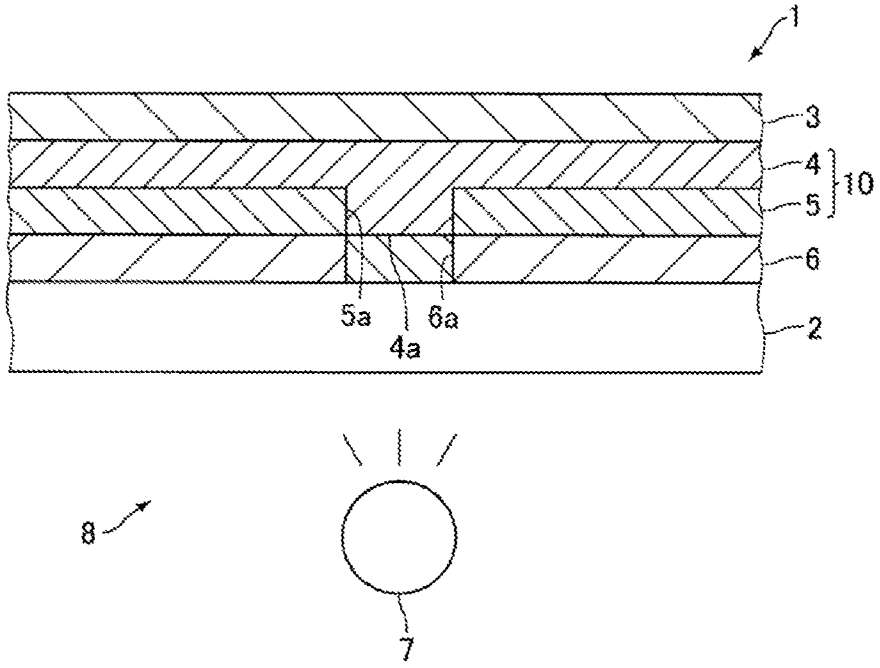
FIG. 2 is a cross-sectional view of the multilayered printed matter illustrated in FIG. 1.
Figure 3A:
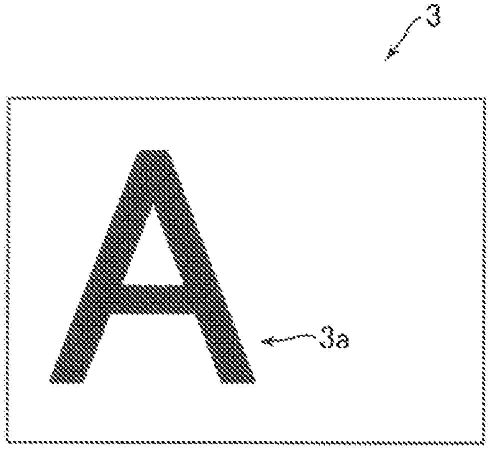
FIG. 3A is a plan view of a first pattern layer illustrated in FIG. 1.
Figure 3B:
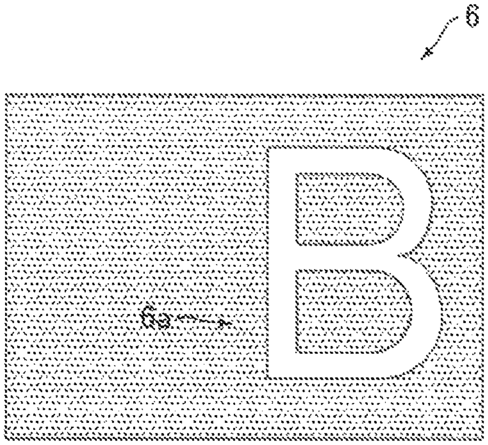
FIG. 3B is a plan view of a second pattern layer illustrated in FIG. 1.
Figure 3C:
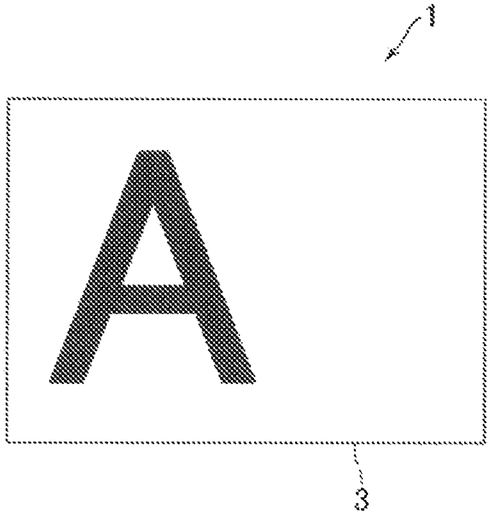
FIG. 3C is a plan view of the multilayered printed matter illustrated in FIG. 1 irradiated with light from a front side, with no light from a light source on a back side.
Figure 3D:
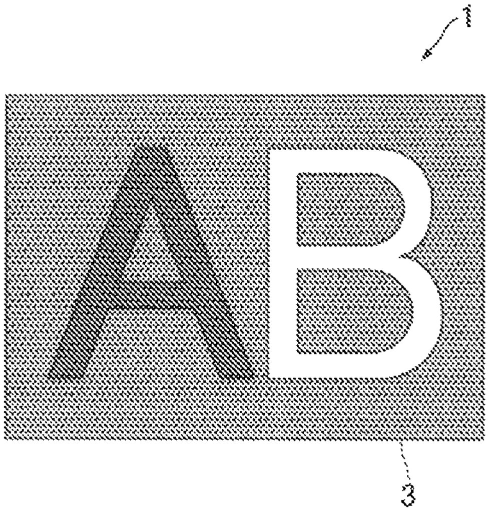
FIG. 3D is a plan view of the multilayered printed matter illustrated in FIG. 1 exposed to light from the light source on the back side, with light coming from the front side being substantially blocked.

FIG. 1 is a perspective view of a multilayered printed matter 1 according to an embodiment of this disclosure. FIG. 2 is a cross-sectional view of the multilayered printed matter 1 illustrated in FIG. 1. FIG. 3A is a plan view of a pattern layer 3 illustrated in FIG. 1. FIG. 3B is a plan view of a pattern layer 6 illustrated in FIG. 1. FIG. 3C is a plan view of the multilayered printed matter 1 illustrated in FIG. 1 irradiated with light from a front side, with no light from a light source 7 on a back side. FIG. 3D is a plan view of the multilayered printed matter 1 illustrated in FIG. 1 exposed to light from the light source 7 on the back side, with light coming from the front side being substantially blocked.

The multilayered printed matter 1 according to this embodiment includes a medium 2, and a plurality of print layers 3 to 6 formed on the medium 2. There are four print layers 3 to 6 in the multilayered printed matter 1 according to this embodiment. The medium 2 may be a transparent flat board made of a resin, for example, an acrylic board, or a transparent film made of a resin, for example, acrylic film. The medium 2 may be a translucent flat board or a film made of a resin.

The print layers 6, 5, 4, and 3 are stacked on one another upward in the mentioned order on one surface of the medium 2. The print layer 6 is formed on one surface of the medium 2, the print layer 5 is formed on the print layer 6, the print layer 4 is formed on the print layer 5, and the print layer 3 is formed on the print layer 4. Provided that the "front" side is a side of this printed matter where the print layers 3 to 6 are formed on the medium 2 and the "back" side is a side opposite to the front side, the multilayered printed matter 1 is set and viewed in a display device 8 equipped with the light source 7 disposed on the back side of this printed matter. The multilayered printed matter 1 set in the display device 8 is viewed from the front side of this printed matter.

UV-curable inks are used to form the print layers 3 to 6. The print layers 3 to 6 are formed and stacked on one another by ejecting and curing the UV-curable inks. The multilayered printed matter 1 is formed by an inkjet printer equipped with an ink head that ejects ink droplets, and an ultraviolet irradiator that cures the ink droplets ejected from the ink head.

The print layers 3 and 6 are pattern layers respectively having patterns printed thereon. In the description below, therefore, the print layer 3 may be referred to as "pattern layer 3", and the print layer 6 may be referred to as "pattern layer 6". The pattern layers 3 and 6 are printed with, for example, color inks. A pattern (alphabet "A") illustrated in FIG. 3A, for example, is printed on the pattern layer 3. A pattern (alphabet "B") illustrated in FIG. 3B, for example, is printed on the pattern layer 6. In this embodiment, the pattern layer 3 is an example of a first pattern layer, and the pattern layer 6 is an example of a second pattern layer. The pattern printed on the pattern layer 3 is not illustrated in FIG. 1.

The pattern layers 3 and 6, on which the patterns are printed, may each have a part(s) lacking effective pixels and/or a thinner part(s) printed at a lower concentration. Then, a recessed part 3*a* recessed into a surface of the pattern layer 3 toward the back side may be formed in the pattern layer 3 in a part(s) thereof lacking effective pixels or printed at a lower concentration. Similarly, a recessed part 6*a* recessed into a surface of the pattern layer 6 toward the back side may be formed in the pattern layer 6 in a part(s) thereof lacking effective pixels or printed at a lower concentration. For example, the recessed part 3*a* may be formed in the pattern layer 3 in a part thereof where the alphabet "A" is printed, and the recessed part 6*a* may be formed in the pattern layer 6 in a part thereof where the alphabet "B" is printed.

The print layer 4 is a white ink layer made of white ink, and the print layer 5 is a black ink layer made of black ink. In the description below, therefore, the print layer 4 may be referred to as "white ink layer 4", and the print layer 5 may be referred to as "black ink layer 5". The white ink layer 4 is formed on the back side of and in contact with the pattern layer 3. The black ink layer 5 is formed on the front side of and in contact with the pattern layer 6. In this embodiment, the black ink layer 5 is formed with black ink in an equal thickness in its entire area. The black ink layer 5 is generally called a solid ink layer painted out in black. The white ink layer 4 is formed with white ink in an equal thickness in its entire area except a protruding part 4*a* described later.

The white ink layer 4 conceals the pattern printed on the pattern layer 6 not to affect the pattern of the pattern layer 3 and also reflects incident light coming from the front side into the multilayered printed matter 1 to allow the pattern printed on the pattern layer 3 to be visually recognized. The black ink layer 5 conceals the pattern printed on the pattern layer 6 not to affect the pattern of the pattern layer 3. The black ink layer 5 has a higher light blocking effect than that of the white ink layer 4. In this embodiment, the white ink layer 4 and the black ink layer 5 constitute a concealing layer 10 formed between the pattern layers 3 and 6 to conceal the pattern printed on the pattern layer 6 not to affect the pattern of the pattern layer 3. The concealing layer 10 has a bi-layered structure of two print layers 4 and 5. The concealing layer 10 is formed on a side of the printed matter closer to the medium 2 than the pattern layer 3. The concealing layer 10 is on the back side relative to the pattern layer 3, and the pattern layer 3 is on the front side relative to the concealing layer 10.

As described earlier, the pattern layer 6 has the recessed part 6*a* recessed into the surface of the pattern layer 6 toward the back side. As illustrated in FIG. 2, the recessed part 6*a* is filled with ink in part of the black ink layer 5 (black ink) on the front side of the pattern layer 6. As a result of the recessed part 6*a* being filled with ink in part of the black ink layer 5, a recessed part 5*a* recessed into a surface of the black ink layer 5 toward the back side is formed at a position on the black ink layer 5 corresponding to the recessed part 6*a*. The white ink layer 4 has the protruding part 4*a* formed to fill the recessed part 5*a* and thereby planarize a surface of the white ink layer 4. The protruding part 4*a* is protruding from the white ink layer 4 toward the back side and fills the recessed part 5*a* so as to planarize the surface of the white ink layer 4. In the white ink layer 4, a portion where the protruding part 4*a* is formed has a concentration higher than that of any other portion.

In this embodiment, two print layers 5 and 6 between the medium 2 and the white ink layer 4 include the black ink layer 5 having the recessed part 5*a* recessed into the surface of this layer toward the back side, and the pattern layer 6 having the recessed part 6*a* recessed into the surface of this layer toward the back side. Interposed between the pattern layer 3, and the black ink layer 5 having the recessed part 5*a* and the pattern layer 6 having the recessed part 6*a* is the print layer 4 having the protruding part 4*a* to fill the recessed part 5*a* and thereby planarize the surface of the white ink layer 4. In this embodiment, the white ink layer 4 having the protruding part 4*a* is an example of a protrusion-formed layer. Thus, the print layer 4 constituting the concealing layer 10 serves as the protrusion-formed layer, which means that the white ink layer 4 formed on the front side relative to the black ink layer 5 serves as the protrusion-formed layer. In this embodiment, the white ink layer 4 on the back side of and in contact with the pattern layer 3 is also an example of a first print layer.

When one observes, from the front side, the multilayered printed matter 1 irradiated with light coming from the front side, with no light from the light source 7 on the back side, he/she may see the pattern of the pattern layer 3 alone, while failing to see the pattern of the pattern layer 6, as illustrated in FIG. 3C. In the multilayered printed matter 1 exposed to light from the light source 7, with light from the front side being substantially blocked, the pattern of the pattern layer 6 may be visible under light from the light source 7. When one observes, from the front side, the multilayered printed matter 1 thus irradiated with light from the light source 7 alone, he/she may see a composite pattern in which the patterns of the pattern layers 3 and 6 are combined.

Principal Effects of this Embodiment

Thus, in this embodiment, while the black ink layer 5 and the pattern layer 6 respectively have the recessed part 5*a* and the recessed part 6*a*, the protruding part 4*a* of the white ink layer 4 fills the recessed part 5*a* so as to planarize the surface of the white ink layer 4. In this embodiment, therefore, the pattern layer 3 may be successfully printed on the substantially planarized surface of the white ink layer 4, and the pattern layer 3 may be unlikely to have any recessed part recessed into the surface of the pattern layer 3 toward the back side at a position(s) irrelevant to the pattern printed thereon. According to this embodiment, therefore, the multilayered printed matter 1 with two pattern layers 3 and 6 and the concealing layer 10 formed between these pattern layers may successfully improve in appearance and visual quality.

In this embodiment providing the white ink layer 4 that constitutes part of the concealing layer 10 and that serves as the protrusion-formed layer, it is unnecessary to form the protrusion-formed layer apart from the concealing layer 10. According to this embodiment, therefore, the multilayered printed matter 1 may be structurally simplified. In the multilayered printed matter 1 of this embodiment, when the pattern printed on the pattern layer 6 is viewed from the front side of this printed matter exposed to light coming from the back side, the protruding part 4*a* formed in the white ink layer 4 may be unlikely to affect the pattern of the pattern layer 6.

First Modified Embodiment of Multilayered Printed Matter

Figure 4A:
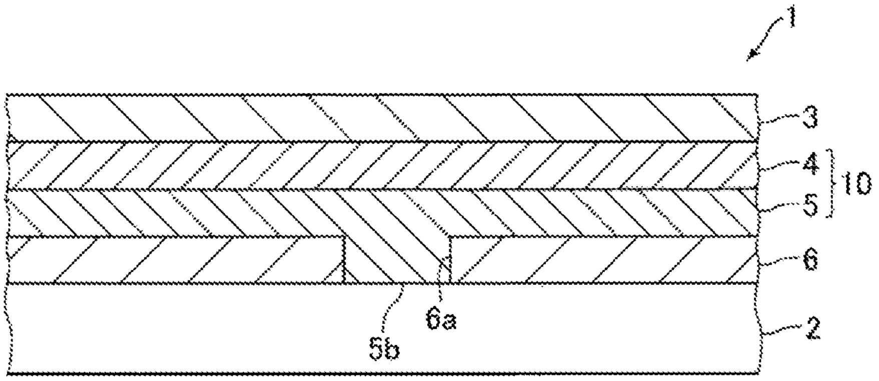
FIGS. 4A to 4D are cross-sectional views of multilayered printed matters according to another embodiments of this disclosure.

FIG. 4A is a cross-sectional view of a multilayered printed matter 1 according to a modified embodiment of this disclosure. In FIG. 4A, like reference signs are used to illustrate the components similar or identical to those described in the earlier embodiment.

In the earlier embodiment, the protruding part 4*a* is formed in the white ink layer 4. Instead, a protruding part 5*b* may be formed in the black ink layer 5 so as to fill the recessed part 6*a* and planarize the surface of the white ink layer 4, as illustrated in FIG. 4A. In this instance, the surface of the white ink layer 4 formed with white ink in an equal thickness in its entire area may be planarized by having the protruding part 5*b* fill the recessed part 6*a* to planarize the surface of the black ink layer 5. Further, two print layers 5 and 6 between the white ink layer 4 and the medium 2 include the print layer 6 having the recessed part 6*a*, and the print layer 5. The print layer 5 formed between the pattern layer 3 and the pattern layer 6 and has the protruding part 5*b* to fill the recessed part 6*a* and thereby planarize the surface of the white ink layer 4. In this instance, the black ink layer 5 having the protruding part 5*b* is an example of the protrusion-formed layer. Thus, the print layer 5 constituting the concealing layer 10 serves as the protrusion-formed layer.

Second Modified Embodiment of Multilayered Printed Matter

Figure 4B:
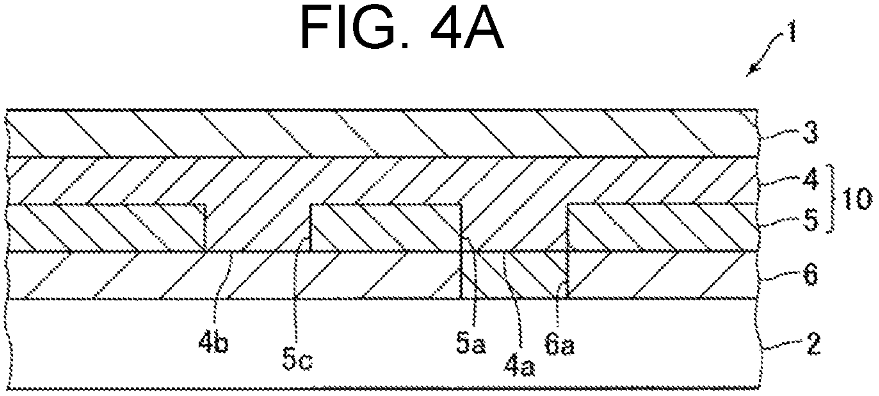
Figure 4C:
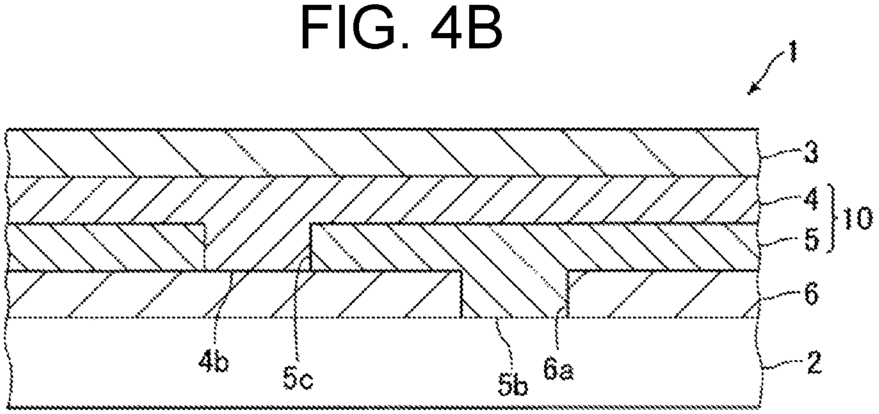
Figure 4D:
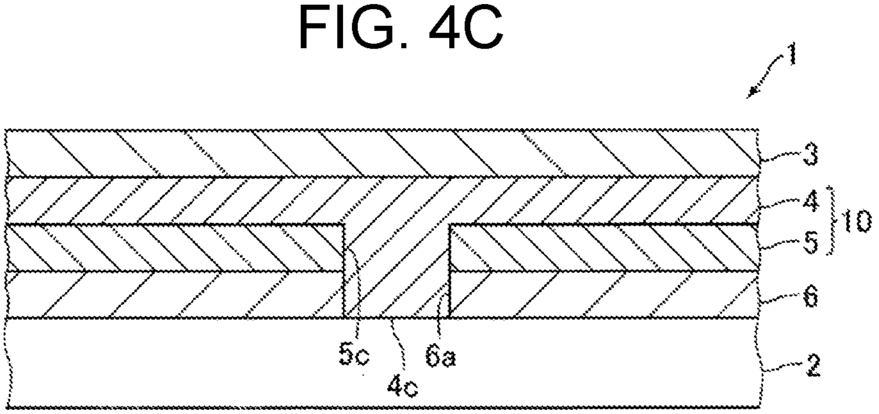

FIGS. 4B to 4C are cross-sectional views of multilayered printed matters 1 according other modified embodiments of this disclosure. In FIGS. 4B to 4D, like reference signs are used to illustrate the components similar or identical to those described in the earlier embodiments.

In contrast to the earlier embodiments, the black ink layer 5 may have a part(s) lacking effective pixels and/or a thinner part(s) printed at a lower concentration. In addition to the recessed part 5*a* formed in the black ink layer 5 as a result of the recessed part 6*a* of the pattern layer 6 being filled with ink of the black ink layer 5, a recessed part 5*c* recessed into the surface of the black ink layer 5 toward the back side may be formed in the effective pixel-lacking part and/or the low-concentration part of the black ink layer 5. In this instance, the recessed part 5*c* may be formed without any overlap with the recessed part 6*a* as illustrated in FIGS. 4B and 4C, or may be formed so as to overlap with the recessed part 6*a* as illustrated in FIG. 4D.

When the recessed part 5*c* is formed without any overlap with the recessed part 6*a*, the recessed part 5*a* (formed in the black ink layer 5 as a result of the recessed part 6*a* of the pattern layer 6 being filled with ink of the black ink layer 5) and the recessed part 5*c* are formed in the black ink layer 5, and a protruding part 4*a* and the protruding part 4*b* that respectively fill the recessed part 5*a* and the recessed part 5*c* so as to planarize the surface of the white ink layer 4 are formed in the white ink layer 4 as illustrated in FIG. 4B. In the modified embodiment illustrated in FIG. 4B, two print layers 5 and 6 between the white ink layer 4 and the medium 2 include the black ink layer 5 having the recessed parts 5*a* and 5*c* and the pattern layer 6 having the recessed part 6*a*, and there is further the print layer 4 between the pattern layer 3, and the black ink layer 5 having the recessed parts 5*a* and 5*c* and the pattern layer 6 having the recessed part 6*a*. The print layer 4 has the protruding parts 4*a* and 4*b* to fill the recessed parts 5*a* and 5*c* and thereby planarize the surface of the white ink layer 4. In case the pattern layer 6 has the recessed part 6*a* and the black ink layer 5 has the recessed part 5*c*, two protruding parts 4*a* and 4*b* formed in the white ink layer 4 may be used to planarize the surface of the white ink layer 4.

When the recessed part 5*c* is formed without any overlap with the recessed part 6*a*, the protruding part 5*b* filling the recessed part 6*a* so as to planarize the surface of the white ink layer 4 may be formed in the black ink layer 5, and the protruding part 4*b* filling the recessed part 5*c* so as to planarize the surface of the white ink layer 4 may be formed in the white ink layer 4, as illustrated in FIG. 4C. In the modified embodiment illustrated in FIG. 4C, two print layers 5 and 6 between the medium 2 and the white ink layer 4 include the black ink layer 5 having the recessed part 5*c* and the pattern layer 6 having the recessed part 6*a*. The print layer 5 having the protruding part 5*b* to fill the recessed part 6*a* and thereby planarize the surface of the white ink layer 4 is formed between the pattern layer 3 and the pattern layer 6 having the recessed part 6*a*, and the print layer 4 having the protruding part 4*b* to fill the recessed part 5*c* and thereby planarize the surface of the white ink layer 4 is formed between the pattern layer 3 and the black ink layer 5 having the recessed part 5*c*. In this instance, the white ink layer 4 and the black ink layer 5 are examples of the protrusion-formed layer, which means that two print layers 4 and 5 constituting the concealing layer 10 constitute the protrusion-formed layer.

When the recessed part 5*c* is formed so as to overlap with the recessed part 6*a*, the protruding part 4*c* filling the recessed parts 5*c* and 6*a* so as to planarize the surface of the white ink layer 4 is formed in the white ink layer 4, as illustrated in FIG. 4D. In the modified embodiment illustrated in FIG. 4D, two print layers 5 and 6 between the white ink layer 4 and the medium 2 include the black ink layer 5 having the recessed part 5*c* and the pattern layer 6 having the recessed part 6*a*, and the print layer 4 having the protruding part 4*c* to fill the recessed parts 5*a* and 6*c* and thereby planarize the surface of the white ink layer 4 is formed between the pattern layer 3, and the black ink layer 5 having the recessed part 5*c* and the pattern layer 6 having the recessed part 6*a*. In case the pattern layer 6 has the recessed part 6*a* and the black ink layer 5 has the recessed part 5*c*, the protruding part 4*c* of the white ink layer 4 may be used to planarize the surface of the white ink layer 4.

Third Modified Embodiment of Multilayered Printed Matter

Figure 5A:
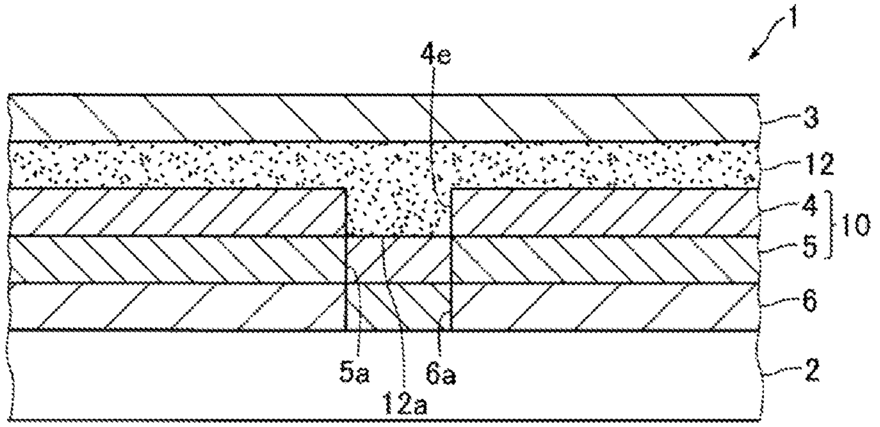
FIGS. 5A to 5C are cross-sectional views of multilayered printed matters according to yet another embodiments of this disclosure.
Figure 5B:
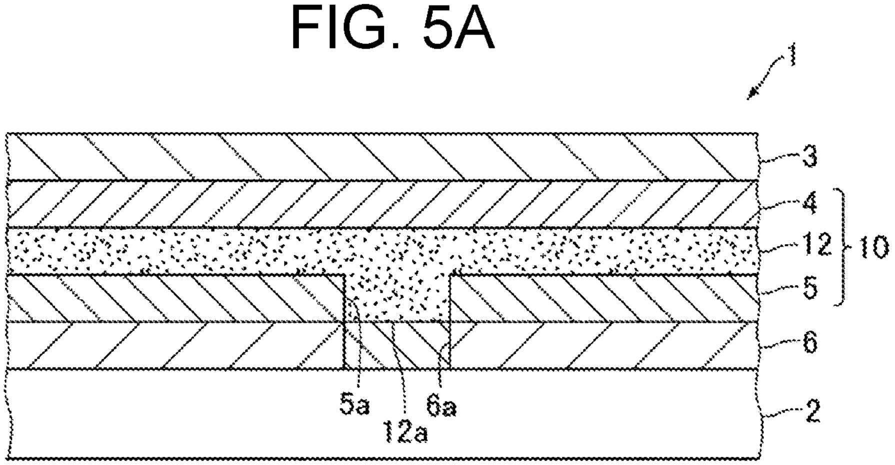
Figure 5C:
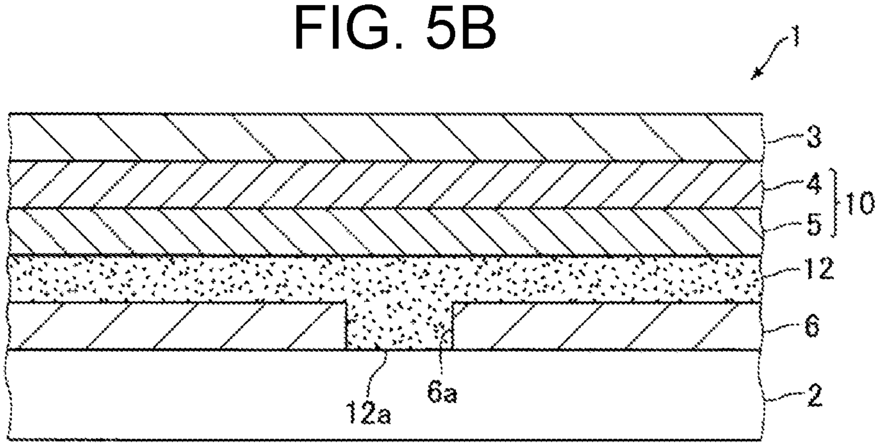

FIGS. 5A to 5C are cross-sectional views of multilayered printed matters 1 according to another modified embodiment of this disclosure. In FIGS. 5A to 5C, like reference signs are used to illustrate the components similar or identical to those described in the earlier embodiments.

While the white ink layer 4 constituting part of the concealing layer 10 is the protrusion-formed layer in the earlier embodiments, the multilayered printed matter 1 may have, apart from the concealing layer 10, a protrusion-formed layer 12 with a protruding part 12*a* formed therein. In this instance, the protrusion-formed layer 12 may be formed between and in contact with the pattern layer 3 and the white ink layer 4, as illustrated in FIG. 5A, or may be formed between and in contact with the white ink layer 4 and the black ink layer 5, as illustrated in FIG. 5B, or may be formed between and in contact with the black ink layer 5 and the pattern layer 6, as illustrated in FIG. 5C.

In the modified embodiment illustrated in FIG. 5A, the recessed part 5*a* of the black ink layer 5 is filled with white ink in part of the white ink layer 4 formed on a front side of the black ink layer 5. As a result of the recessed part 5*a* being filled with ink in part of the white ink layer 4, a recessed part 4*e* recessed into the surface of the white ink layer 4 toward the back side is formed at a position on the white ink layer 4 corresponding to the recessed part 5*a*. The protruding part of the protrusion-formed layer 12 is protruding from this layer toward the back side and fills the recessed part 4*e* so as to planarize the surface of the protrusion-formed layer 12.

In modified embodiment illustrated in FIG. 5A, three print layers 4 to 6 formed between the medium 2 and the protrusion-formed layer 12 include the print layer 4 having the recessed part 4*e*, the black ink layer 5 having the recessed part 5*a*, and the pattern layer 6 having the recessed part 6*a*. Interposed between the pattern layer 3, and the print layer 4 having the recessed part 4*e*, black ink layer 5 having the recessed part 5*a*, and pattern layer 6 having the recessed part 6*a* is the protrusion-formed layer 12 having the protruding part 12*a* to fill the recessed part 4*e* and thereby planarize the surface of the protrusion-formed layer 12. In this modified embodiment, the protrusion-formed layer 12 is an example of the first print layer and is formed on the back side of and in contact with the pattern layer 3.

In the modified embodiment illustrated in FIG. 5B, the protruding part 12*a* fills the recessed part 5*a* so as to planarize the surfaces of the white ink layer 4 and the protrusion-formed layer 12. In this modified embodiment, three layers; print layers 5 and 6 and the protrusion-formed layer 12, between the white ink layer 4 and the medium 2 include the black ink layer 5 having the recessed part 5*a*, the pattern layer 6 having the recessed part 6*a*, and the protrusion-formed layer 12 formed between the pattern layer 3, and the black ink layer 5 having the recessed part 5*a* and the pattern layer 6 having the recessed part 6*a*. The protrusion-formed layer 12 has the protruding part 12*a* to fill the recessed part 5*a* and thereby planarize the surface of the white ink layer 4. In the modified embodiment illustrated in FIG. 5B, the white ink layer 4, black ink layer 5, and protrusion-formed layer 12 constitute the concealing layer 10.

In the modified embodiment illustrated in FIG. 5C, the protruding part 12*a* fills the recessed part 6*a* so as to planarize the surfaces of the protrusion-formed layer 12 and the black ink layer 5 and consequently planarize the surface of the white ink layer 4. In this modified embodiment, three layers; print layers 5 and 6 and the protrusion-formed layer 12, between the white ink layer 4 and the medium 2 include the pattern layer 6 having the recessed part 6*a*, and the protrusion-formed layer 12 formed between the pattern layer 3 and the pattern layer 6 having the recessed part 6*a*. The protrusion-formed layer 12 has the protruding part 12*a* to fill the recessed part 5*a* and thereby planarize the surface of the white ink layer 4.

In the modified embodiments illustrated in FIGS. 5A to 5C, the protrusion-formed layer 12 may be a white ink layer made of white ink or a clear ink layer made of transparent ink. In the multilayered printed matter 1 according to any one of these modified embodiments, when the pattern printed on the pattern layer 6 is viewed from the front side of this printed matter exposed to light coming from the back side, the protruding part 12*a* may be unlikely to affect the pattern of the pattern layer 6. Any other suitable ink but white and clear inks may be used to form protrusion-formed layer 12. The multilayered printed matter 1 may have the protrusion-formed layer 12 having the protruding part 12*a* apart from the white ink layer 4 having the protruding part 4*a*.

Fourth Modified Embodiment of Multilayered Printed Matter

Figure 6A:
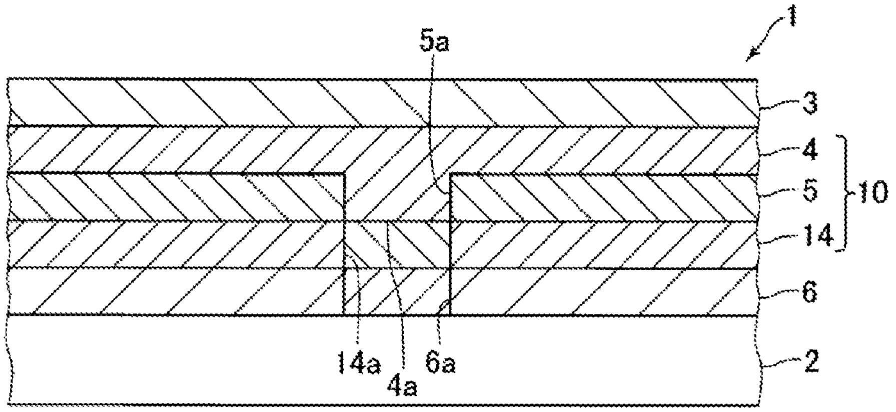
FIGS. 6A and 6B are cross-sectional views of multilayered printed matters according to yet another embodiments of this disclosure.
Figure 6B:
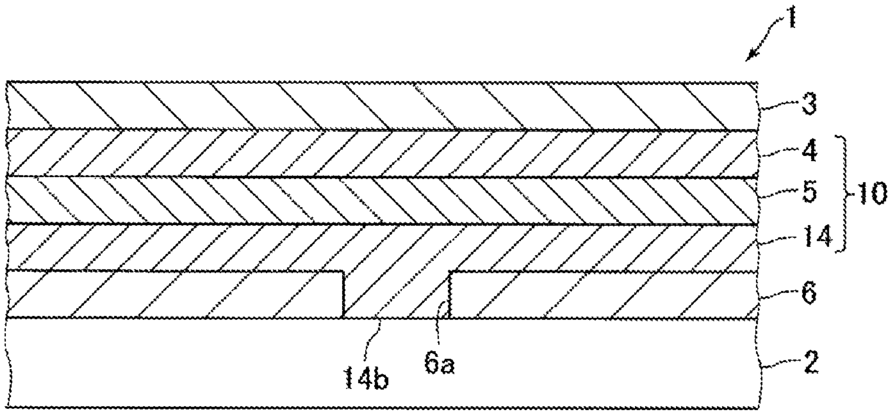

FIGS. 6A and 6B are cross-sectional views of multilayered printed matters 1 according to another modified embodiment of this disclosure. In FIGS. 6A and 6B, like reference signs are used to illustrate the components similar or identical to those described in the earlier embodiments.

In contrast to the earlier embodiments, the concealing layer 10 may include the black ink layer 5, the white ink layer 4, and a white ink layer 14 (print layer 14) formed between the pattern layer 6 and the black ink layer 5, as illustrated in FIGS. 6A and 6B. In these modified embodiments, the white ink layer 14 conceals the pattern printed on the pattern layer 3 not to affect the pattern of the pattern layer 6 and reflects incident light coming from the back side into the multilayered printed matter 1 to allow the pattern of the pattern layer 6 to be visually recognized. The black ink layer 5 completely conceals the pattern printed on the pattern layer 6 not to affect the pattern of the pattern layer 3 and completely conceals the pattern printed on the pattern layer 3 not to affect the pattern of the pattern layer 6. The multilayered printed matter 1 according to any one of the modified embodiments of FIGS. 6A and 6B, an exemplified application of which is a pencil board as a stationery product, is not for use in the display device 8.

When the black ink layer 5 and the white ink layers 4 and 14 thus constitute the concealing layer 10, as illustrated in FIG. 6A, the recessed part 6*a* is filled with ink in part of the white ink layer 14 on the front side of the pattern layer 6, and a recessed part 14*a* recessed into the surface of the white ink layer 14 toward the back side is formed at a position on the white ink layer 14 corresponding to the recessed part 6*a*. As a result of the recessed part 14*a* being filled with ink in part of the black ink layer 5, the recessed part 5*a* is formed at a position on the black ink layer 5 corresponding to the recessed part 14*a*. The white ink layer 4 has the protruding part 4*a* formed to fill the recessed part 5*a* and thereby planarize the surface of the white ink layer 4.

In the modified embodiment illustrated in FIG. 6A, three print layers 5, 6, and 14 between the white ink layer 4 and the medium 2 include the black ink layer 5 having the recessed part 5*a*, the white ink layer 14 having the recessed part 14*a*, and the pattern layer 6 having the recessed part 6*a*, and there is further the print layer 4 between the pattern layer 3, and the black ink layer 5 having the recessed part 5*a*, the white ink layer 14 having the recessed part 14*a*, and the pattern layer 6 having the recessed part 6*a*. The print layer 4 has the protruding part 4*a* to fill the recessed part 5*a* and thereby planarize the surface of the white ink layer 4.

When the black ink layer 5 and the white ink layers 4 and 14 constitute the concealing layer 10, the white ink layer 14 may have a protruding part 14*b* to fill the recessed part 6*a* and planarize the surfaces of the white ink layer 14 and the black ink layer 5 and consequently planarize the surface of the white ink layer 4, as illustrated in FIG. 6B. In the modified embodiment illustrated in FIG. 6B, three print layers 5, 6, and 14 between the white ink layer 4 and the medium 2 include the print layer 6 having the recessed part 6*a*, and the print layer 14. The print layer 14 is formed between the pattern layer 3 and the pattern layer 6 having the recessed part 6*a* and has the protruding part 14*b* to fill the recessed part 6*a* and thereby planarize the surface of the white ink layer 4.

Fifth Modified Embodiment of Multilayered Printed Matter

Figure 7:
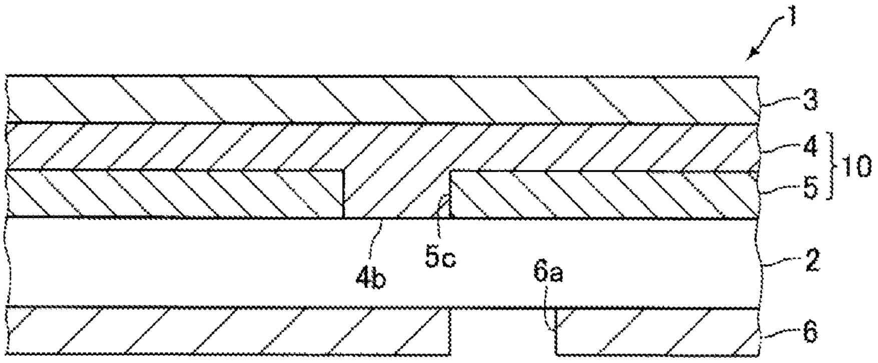
FIG. 7 is a cross-sectional view of a multilayered printed matter according to a different embodiment of this disclosure.
Figure 8:
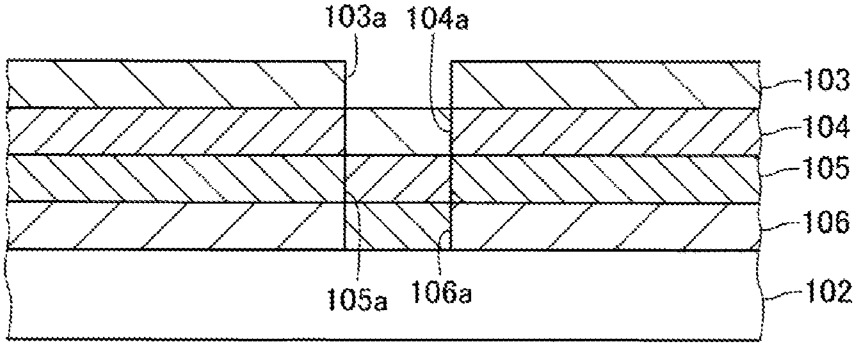
FIG. 8 (RELATED ART)
FIG. 8 is a cross-sectional view of a multilayered printed matter illustrated to address issues of the known art.

FIG. 7 is a cross-sectional view of multilayered printed matters 1 according to another modified embodiment of this disclosure. In FIG. 7, like reference signs are used to illustrate the components similar or identical to those described in the earlier embodiments.

In contrast to the earlier embodiments, the pattern layer 6 may be formed on a back-surface side of the medium 2, and the pattern layer 3 and the concealing layer 10 may be formed on a front-surface side of the medium 2. In this instance, the black ink layer 5 may have a part(s) lacking effective pixels and/or a thinner part(s) printed at a lower concentration, and a recessed part 5*c* recessed into the surface of the black ink layer 5 toward the back side may be formed in the effective pixel-lacking part and/or the low-concentration part of the black ink layer 5. The white ink layer 4 has the protruding part 4*b* to fill the recessed part 5*c* and thereby planarize the surface of the white ink layer 4. In these modified embodiments, the print layer 5 between the medium 2 and the white ink layer 4 has the recessed part 5*c*, and the print layer 4 having the protruding part 4*b* to fill the recessed part 5*c* and thereby planarize the surface of the white ink layer 4 is formed between the pattern layer 3 and the black ink layer 5 having the recessed part 5*c*. In these modified embodiments, the recessed part 6*a* is penetrating through the pattern layer 6.

Other Embodiments

In the embodiments described thus far, the concealing layer 10 may solely consist of the white ink layer 4, in which case the recessed part 6*a* is filled with the protruding part 4*a*. In the embodiments described thus far, the concealing layer 10 may include four or more print layers, and/or the pattern layer 3 and/or the print layer 6 may include two or more print layers.

As described thus far, this disclosure may achieve improved appearance and visual quality of a multilayered printed matter formed of a plurality of print layers on a medium including two pattern layers having patterns printed thereon and a concealing layer formed between the pattern layers.

Various embodiments and modifications are possible without departing from the broader spirit and scope of the present disclosure. In addition, the above-described embodiments are only for describing the present disclosure and do not limit the scope of the present disclosure. Namely, the scope of the present disclosure is determined not due to the embodiments but due to the claims. Various modifications that are made within the scope of the claims and within the meaning of the disclosure equivalent thereto are considered to be within the scope of the present disclosure.

What is claimed is:

1. A multilayered printed matter, comprising:

a medium; and a plurality of print layers, being stacked on one another on one surface of the medium, wherein the plurality of print layers comprises:

a first pattern layer, as one of the plurality of print layers, comprises first patterns;

a second pattern layer, as one of the plurality of print layers, comprises second patterns, wherein the first patterns formed on the first pattern layer is different from the second patterns formed on the second pattern layer;

a concealing layer, as at least one of the plurality of print layers, formed between the first pattern layer and the second pattern layer on a side of the multilayered printed matter closer to the medium than the first pattern layer, the concealing layer concealing the second patterns printed on the second pattern layer not to affect the first patterns printed on the first pattern layer;

a first print layer, as one of the plurality of print layers, wherein a front side is a side on which the first pattern layer is formed relative to the concealing layer, a back side is a side opposite to the front side, and the first print layer is disposed on the back side of the first pattern layer and in contact with the first pattern layer;

at least one print layer having a recessed part, as the print layers disposed between the medium and the first print layer, the recessed part being recessed from a surface of the at least one print layer toward the back side, wherein the recessed part is a place where lacking effective pixels or being printed at a low concentration; and at least one print layer having a protruding part, as the print layers disposed between the first pattern layer and the at least one print layer having the recessed part, the protruding part protruding toward the back side, the protruding part being formed to fill at least one recessed part so as to planarize a surface of the first print layer, wherein provided that the at least one print layer having the protruding part is a protrusion-formed layer, the protruding part fills the recessed part of the at least one print layer having the recessed part disposed on the back side of the protrusion-formed layer and in contact with the protrusion-formed layer.

2. The multilayered printed matter according to claim 1, wherein the concealing layer comprises more than one of the plurality of print layers, and at least one of the plurality of print layers constituting the concealing layer is the protrusion-formed layer.

3. The multilayered printed matter according to claim 2, wherein the concealing layer comprises, as one of the plurality of print layers, a white ink layer made of white ink and a black ink layer made of black ink, and the white ink layer is the protrusion-formed layer.

4. The multilayered printed matter according to claim 3, wherein the white ink layer is formed on the front side relative to the black ink layer.

5. The multilayered printed matter according to claim 4, wherein the white ink layer constituting the protrusion-formed layer is the first print layer.

6. The multilayered printed matter according to claim 1, wherein the protrusion-formed layer is apart from the concealing layer.

7. The multilayered printed matter according to claim 6, wherein the protrusion-formed layer is a white ink layer made of white ink or a clear ink layer made of transparent ink.

8. The multilayered printed matter according to claim 1, wherein the first pattern layer, the concealing layer, and the second pattern layer are formed on a front-surface side of the medium, and at least the second pattern layer has the recessed part.

9. The multilayered printed matter according to claim 1, wherein the concealing layer comprises, as one of the plurality of print layers, a white ink layer made of white ink and a black ink layer made of black ink, the second pattern layer is formed on a back-surface side of the medium, the first pattern layer and the concealing layer are formed on a front-surface side of the medium, the white ink layer is formed on a front side of the black ink layer, and the black ink layer has the recessed part.

* * * * *